March 26, 1957  A. CHAUSSON  2,786,340
APPARATUS FOR LUBRICATING AND FILTERING
THE COOLANT FLUID IN REFRIGERATORS
Filed Feb. 25, 1954  3 Sheets-Sheet 1
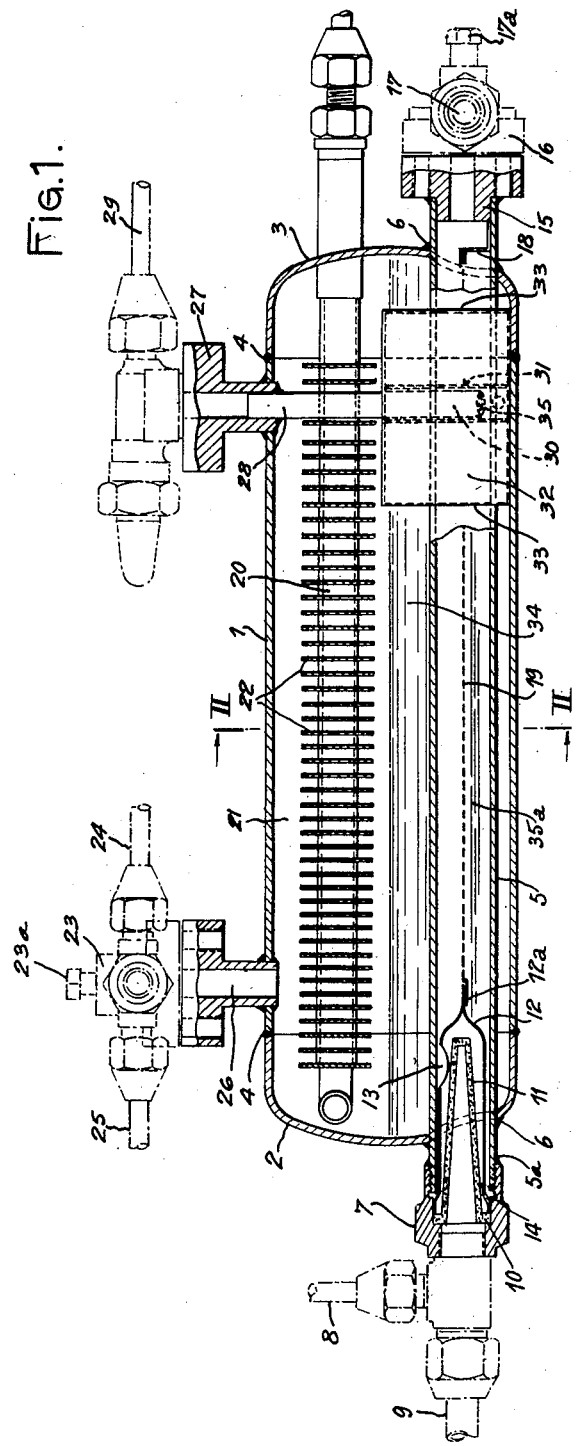
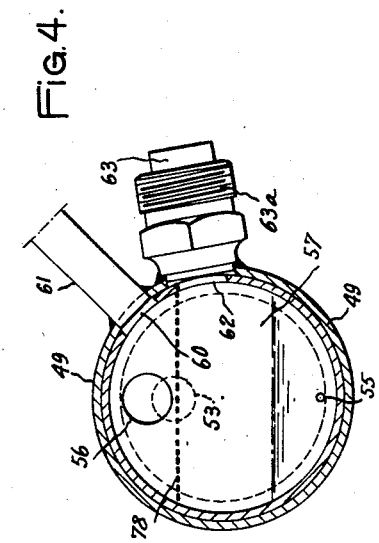
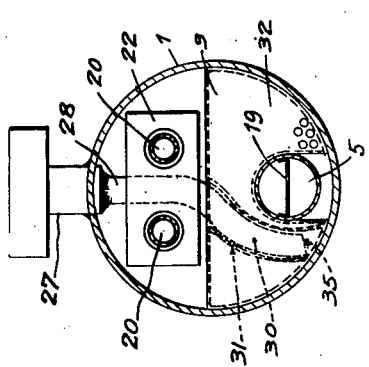
INVENTOR
ANDRÉ CHAUSSON

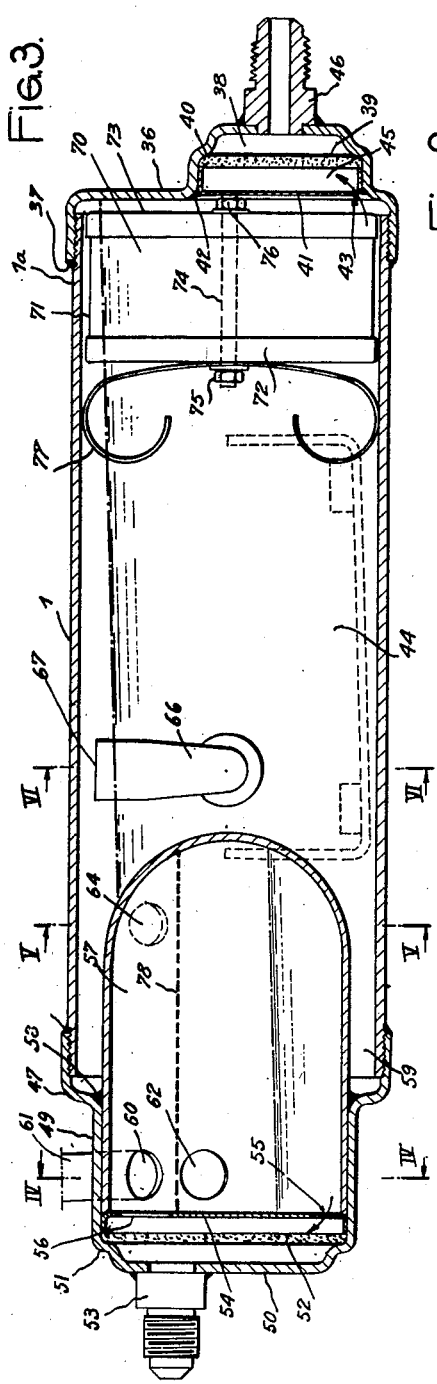
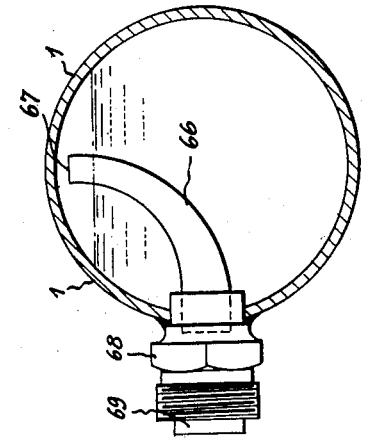
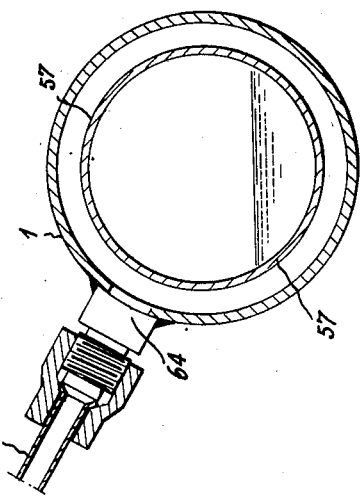

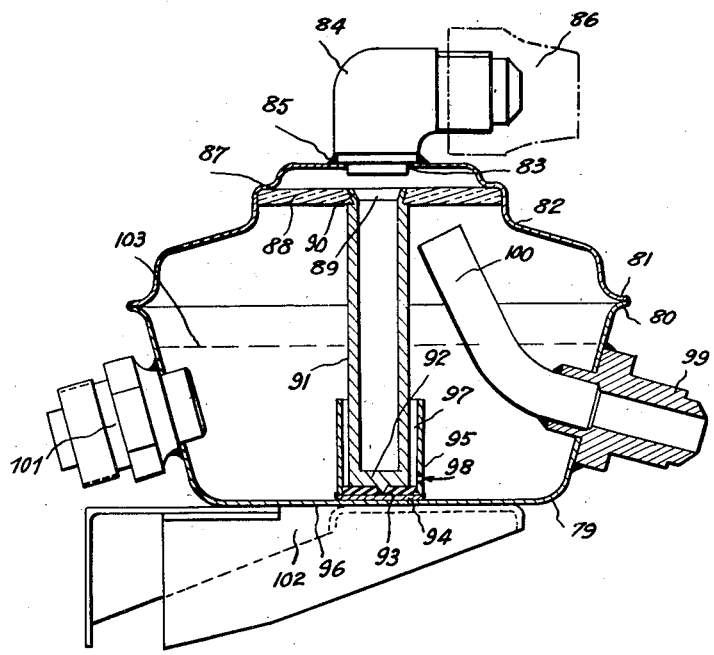

2,786,340
Patented Mar. 26, 1957

United States Patent Office

2,786,340

APPARATUS FOR LUBRICATING AND FILTERING THE COOLANT FLUID IN REFRIGERATORS

André Chausson, Asnieres, France, assignor to Societe Anonyme des Usines Chausson, Asnieres, France, a company of France Application February 25, 1954, Serial No. 412,587

Claims priority, application France March 9, 1953

11 Claims. (Cl. 62—117.75)

It is often difficult, in refrigerating apparatus, to suitably lubricate the moving parts in the compressor. It has been suggested to introduce, in the circuit of the refrigerating apparatus, a charge of lubricant together with that of the coolant fluid. However, considerable difficulty has been experienced, particularly in small units, such as those adapted for household use, by the accumulation of a large amount of lubricant in the liquid refrigerant circuit, and because such quantity of lubricant remains in that portion of the circuit, an insufficient amount being carried over to the compressor and other working parts to keep them properly lubricated. Another very serious drawback is that the lubricant is brought, at times, in large quantities into the compressor, while, at other times, this compressor is insufficiently lubricated and consequently is easily damaged.

The present invention obviates these drawbacks by creating a device for the lubrication, continuous filtering and possibly a regulation of the flow of lubricant and the condensation of the coolant fluid in compression type refrigerating apparatus.

According to the invention, the device for the lubrication and continuous filtering in the circuit of the compression type refrigerating apparatus comprises an enclosure partly filled with oil, communicating, at its upper portion, with the suction of the compressor and inside which a duct opens, coming from the evaporator, so that the gases and oil brought through this duct are compelled to go through one or more elements of sintered material arranged inside the enclosure before being brought in the suction circuit of the compressor.

Another object of the invention is to create such a device which allows in addition, a thermal exchange between the condensed fluid and the fluid issuing from the evaporator, so as to improve the efficiency of the refrigerating apparatus by supplying the expander with coolant fluid in a liquid condition and already partly cooled.

According to another feature of the invention the device is arranged inside a tank in which the coolant fluid from the condenser is brought so as to sweep over the walls of the enclosure filled with cold vapour so that the coolant fluid coming from the evaporator and coming into this enclosure absorbs part of the calories released by the coolant fluid from the condenser in order that this latter fluid be brought in the expansion valve of the circuit at a temperature for which the efficiency of the apparatus is close to a maximum for the coolant fluid, such as Freon, which is used in said apparatus. It is in fact well known that the efficiency of a refrigerating apparatus is considerably increased when the condensed coolant fluid is brought to the expansion valve at a determined temperature and when the cold fluid coming from the evaporator is preheated before its sucking by the compressor, the temperature at the inlet of the compressor being, of course, dependent on the value of the compression rate to which the fluid must be compressed and the nature of that fluid.

According to a third feature of the invention, a condensing coil is provided at the upper portion of the tank containing the enclosure through which passes the cold coolant fluid from the evaporator, so that the coolant fluid compressed by the compressor is brought directly into said tank in which it is condensed and cooled before being brought to the expander of the refrigerating apparatus.

Various other characteristics of the device according to the invention will appear from the following detailed description.

Forms of embodiment of the object of the invention are represented, by way of non limitative examples, in the appended drawings:

Fig. 1 is a longitudinal elevational section, illustrating a form of embodiment of the device of the invention.

Fig. 2 is a section along line II—II of Figure 1.

Fig. 3 is a longitudinal section illustrating a modified embodiment of the device of the invention.

Fig. 4 is a section along line IV—IV of Figure 3.

Fig. 5 is a section along line V—V of Fig. 3.

Fig. 6 is a section along line VI—VI of Fig. 3.

Fig. 7 is an elevational section illustrating another form of embodiment of the device.

The devices shown in Figs. 1 and 2 comprise a casing 1, consisting of a cylindrical tubular element which is closed, at each one of its ends, by caps 2 and 3 which are added and secured in a tight manner by means of welding 4, for example.

Through the casing 1, at its lower portion, passes a tube 5 the length of which is slightly larger than the length of the casing, so that it protrudes beyond the caps 2 and 3. Welds 6 or any other suitable joint, ensure the sealing between the caps, on the one hand, and the tube 5, on the other hand. The latter tube offers, at its end 5a, a screw thread on which is screwed a connection 7 for connecting it with two ducts 8 and 9.

The connection 7 is shaped, inside, so as to serve as a housing for the end, forming a shoulder 10, of a filtering cartridge 11, of sintered bronze, for instance.

The cartridge 11 is enclosed, as shown in the drawing, in a box 12 which offers, at its upper portion, an aperture 13 placing it in communication with the inside of the tube 5, and at its lower portion, a small section hole 14 also placing in communication its inside with that of the tube 5.

The free end of the tube 5 is closed by an end piece 15 which supports a control valve 16 for controlling the passage section for the fluid brought by a duct 17 coming from the evaporator of the refrigerating apparatus, in the circuit of which the device is mounted. An orifice, normally closed by a plug 17a gives access to the inside of the tube, in particular for filling it with oil.

A support 18, arranged near the connection 15 cooperates with the end 12a, shaped to this effect, of the box 12 for supporting a cloth or metal gauze 19, the width of which is equal to the inner diameter of the tube 5. As shown in the drawing, this cloth is stretched substantially along the longitudinal axis of the tube.

20 is a condenser coil which may have various shapes and which is arranged horizontally at the upper portion of the chamber 21, limited by the casing 1 of the device. This coil comprises fins 22 facilitating the thermal exchange, as will be explained hereinafter.

23 is a flow control valve for a duct, not shown, bringing the gaseous fluid forced by the compressor in the circuit of the refrigerating apparatus.

The input of the valve 23 is connected, through a T-shaped connection, with two ducts 24, 25 and to an end piece 26 opening into the chamber 21. The duct 24 is connected with a valve controlling the operation of the refrigerating compressor, as a function of the pressure obtaining inside the enclosure 1, and the duct 25 is connected, for instance with a pressure gauge which makes it possible to know, at any instant, the pressure obtaining on the delivery side of the compressor.

An orifice, normally closed by a plug 23a gives access to the high pressure circuit of the device, in particular for charging with coolant fluid and carrying out, if necessary, the draining of non condensable vapours or excess liquid.

An end piece 27, similar to the end piece 26, arranged in the example of embodiment shown, near the other end of the casing 1, puts a tube 28 in communication with a duct 29 leading to the expander.

As shown in the drawing and particularly in Fig. 2, the tube 28 offers a curved portion 30 which is engaged in a tubular socket 31, preferably made of sintered metal. This socket is secured, by any suitable means but in a tight manner, on the upper and lower walls of a dehydrating device 32. This latter device is so shaped as to be capable of fitting over the tube 5 and it contains, inside, a dehydrating product such as silica gel or any other suitable product.

The two terminal sides 33, at least, of the device, consist of perforated metal sheets or grids, allowing the fluid 34 contained in the chamber 21, to pass into the dehydrating device 32, then through the walls of the sintered socket 31 to be admitted, through the lower orifice 35 of the tube 28 which directs it towards the connection 27.

The above described device operates as follows:

The fluid under pressure coming from the compressor is brought by the valve 23 into the connection 26 which directs it on the top of the condenser coil 20. In contact with the latter, the coolant fluid cools down and liquefies so that it falls to the bottom of the chamber 21 for forming the liquid mass 34. The saturating vapour which is contained above the level of the liquid 34 exerts on the latter a pressure which compels it to go through the dehydrating device then to pass through the pipe 28 and the connection 27 to the duct 29 which brings it to the expander of the refrigerating apparatus.

The orifice 35 of the pipe 28 being located close to the lowermost point of the chamber 21, this results in the coldest liquid being sent to the expander.

The sintered socket 31 has the effect of filtering the coolant fluid which is thus cleansed of any impurities it might have contained.

The condenser coil 22 is, in the form of embodiment shown, a coil with a water circulation, but, obviously the cooling fluid flowing through this coil might be any other fluid.

The cooling fluid under a low pressure coming from the evaporator of the refrigerating apparatus is brought, as already explained, through the duct 17 which is in communication, through the valve 16 with the tube 5. This coolant fluid is cold and charged with oil. The oil it contains forms a deposit in the tube 5, up to a level 35a, for example.

The metal grid 19, which is arranged in this tube, prevents the formation of foam which might clog up the ducts, particularly when starting the compressor.

The coolant fluid, freed of its oil, then goes, under the suction action effected by the suction of the compressor, through the orifice having large dimensions 13, drilled in the box 12, then said fluid is made to go through the walls of the sintered cartridge 11, which results in its filtering. The oil contained in the tube 5 goes through a hole having small dimensions 14 and soaks the sintered cartridge 11 which filters it.

The passing of gases through the cartridge 11 taking place at a relatively high speed, these gases, consequently, carry along with them a certain amount of oil which is used for the lubrication of the moving parts in the compressor.

The position of the hole 14 which is located at the lower portion of the tube 5 makes it possible to charge with oil, regularly, the gaseous coolant fluid sucked in by the compressor, even if the level 35a drops, as happens in some periods of operation.

Given the position occupied by the tube 5 inside the casing 1, this tube is always in contact with the liquid coolant so that the latter which is relatively hot is cooled by the low pressure fluid circulating in the tube 5 and coming directly from the evaporator. This thermal exchange has the effect of always bringing to the expander of the refrigerating apparatus relatively cold liquid, which improves the general efficiency of the refrigerating apparatus. Similarly, the low pressure fluid being already in a gaseous condition upon issuing from the evaporator is overheated in the tube 5, which makes it possible to always supply the compressor with dry vapour of coolant fluid at a suitable temperature. It is obvious that the dry vapours of coolant are charged with lubricant since these vapours are obliged to pass to be sucked by the compressor through the cartridge 11 impregnated with oil.

According to the form of embodiment represented in Figs. 3 to 6, 1 designates the casing of the device. This casing consists in a cylindrical tubular element.

The end 1a of the casing is closed by means of a cover 36, screwed on a threaded portion of the casing, then soldered preferably with tin solder, at 37, so as to ensure a complete sealing and a sufficient mechanical strength between the envelope and its cover.

The cover 36 forms a housing 38 in which is arranged a filtering element 39 which, according to the form of embodiment shown consists of a wafer of sintered metal. This wafer bears against a shoulder 40, formed by the cover, and it is held by a dished element 41, soldered at 42 to the cover.

The dished element 41 offers, at its lower portion, a notch 43 placing in communication a chamber 44, defined by the casing of the device, with a chamber 45 formed by the dished element 41 and the sintered wafer 39.

46 designates a connection which is secured in the bottom of the housing 38 formed by the cover 36, this connection being for the purpose of connecting the device with a duct, the end of which is connected with the expander of the refrigerating apparatus.

The other end of the casing 1 is formed by a cover 47 which is also screwed on a threaded portion of this casing, then soldered by means of seams 48 ensuring tightness.

This last cover offers a cylindrical body 49 and a bottom 50, so shaped as to constitute a shoulder 51 serving as a stop for a filtering wafer of sintered metal 52.

A connection 53, similar to the connection 46 described above, is secured in a tight manner in the bottom 50 of the cover, the purpose of this connection being to connect that part of the device with the inlet to the compressor for the coolant fluid mounted in the refrigerating apparatus.

The sintered wafer 52 is held against the shoulder 51 of the cover by a dished element 54 acting as a wall, which offers an orifice having a very small section 55 and a hole 56, the section of which is at least equal to that of the duct linking the connection 53 with the intake to the compressor.

The cylindrical body 49, formed by the cover 47, serves as a housing for the open end of a bell 57, which is forced in and held by means of welds 58 ensuring an entire tightness in such a manner that the inside of that bell can in no case communicate with the chamber 44 defined by the casing 1 of the device.

The inner diameter of the body 49, formed by the cover 47 being smaller than that of the casing 1 an annular passage 59 is provided between the bell 57 and the casing.

The inside of the bell is in communication, through an orifice 60 with a duct 61 coming from the evaporator of the refrigerating apparatus. A second hole 62, drilled in said bell and in the body 49 is normally closed by a stopper 63 (Fig. 4) making is possible to effect, if necessary, pressure readings by means of a suitable device screwing on a threaded portion of a connection 63a.

The casing 1 is connected, as shown, especially in Figs. 3 and 5, by an end piece 64, with a duct 65 coming from the outlet of the condenser of the refrigerating apparatus.

The end piece 64 is so arranged that the coolant fluid from the condenser sweeps, on arriving, over the walls of the bell 57.

66 (Figs. 3 and 6) designates a bent tube, arranged inside the casing 1, so that its aperture 67 be located substantially at the highest point of the chamber 44 defined by that casing. This tube is connected with a connection 68 which is normally closed, by means of a plug 69 (Fig. 6).

A dehydrating cartridge 70 is arranged inside the chamber 44, as shown in Fig. 3. This cartridge comprises a casing 71, closed at each end by perforated covers 72 and 73 which are held on said casing by means of a threaded rod 74, at the two ends of which are screwed nuts 75 and 76.

77 designates a blade spring which is held on the threaded rod 74 by the nut 75. This spring is provided for preventing the cartridge 70 from being displaced inside the chamber 44.

A dehydrating product, such as silica gel or any other suitable product, fills the cartridge 70.

The assembly of the above described device is slightly inclined with respect to the horizontal, as shown in Fig. 3, and this in such a manner that the notch 43 which is provided in the dished element 41, holding the sintered wafer 39 be located substantially at the lowermost point of the device.

During the normal operation of the apparatus, the low pressure vapour of coolant fluid coming from the evaporator enters the bell 57 through the orifice 60 thereof. The greater portion of the oil carried along by the vapour is deposited by gravity in the bottom of the bell. This oil flows through the small size orifice 55 provided at the lower portion of the wall 54, thus impregnating the sintered metal wafer 52. The oil rises in the latter wafer by capillarity and saturates it, so that the collant fluid sucked in by the compressor passes through the hole 56 provided in the upper portion of the wall 54 then goes through the sintered wafer, which has the effect of filtering it and then charging it with oil before it is admitted in the duct which takes it to the compressor.

While the above described operations are occurring, the coolant fluid coming from the condenser is brought into the chamber 44. This fluid, which is liquid, sweeps over the walls of the bell yielding part of its calories to the cold vapour of coolant fluid which is inside said bell.

The liquid coolant fluid contained in the chamber 44 is cooled, which causes the same effect as in the device described above and represented in Figs. 1 and 2.

The tube 66, the aperture of which 67 is located at the upper portion of the chamber 44 is provided, when desired, for evacuating non condensable elements or the excess of coolant fluid by removing the stopper or plug 69.

In order to prevent the oil which flows into the bell 57 from forming a foam, a grid 78 is arranged inside the bell 57, so that the oil droplets entering said bell through the orifice 60 fall first of all on that grid before reaching the bottom of the bell.

In Fig. 7 the device comprises a tank 79 which forms, at its periphery, a marginal rim 80 on which bears a corresponding marginal rim 81 formed by a cap 82. The rims 80 and 81 are soldered together at the end of the assembling, so that the connection is absolutely tight.

The top of the cap 82 is bored with a hole 83 in which is engaged an end piece 84 which is associated with said cap by soldered seams 85.

The free end of the end piece 84 is threaded so that a duct 86 represented in mixed lines may be screwed or secured by any other suitable means on that end.

The duct 86 is meant to connect the device with the inlet to the refrigerating compressor.

87 designates a shoulder which is formed by swaging or any other suitable means near the top of the cap 82 so that said shoulder serves as a stop for a filtering element 88 which in the example of embodiment shown is a sintered wafer.

The sintered wafer 88 is bored, at its middle portion, with a hole 89 in which is engaged, then spun at 90, the end of a hollow cylindrical element 91, also made of sintered metal, the bottom 92 of which rests on an elastic element 93, which is arranged on the bottom 94 of a support 95 associated with the bottom 96 of the tank 79.

The support 95 consists in a cylindrical element, the inner diameter of which is slightly larger than that of the sintered tube 91, so that there always exists an annular channel 97 between these two elements. A hole of small dimensions 98 is bored near the base of the support 95.

The duct coming from the evaporator of the refrigerating apparatus is in communication with the inside of the tank 79 through an end piece 99 secured by soldering or any other suitable means to said tank.

A tube 100 is partly engaged in the inside of the end piece 99 and is bent, as shown in the drawing, so that its end be located near the intersection of the sintered tube 91 and the sintered wafer 88.

101 designates a connection making it possible to recharge the device and, possibly, to raise the pressure obtaining inside the latter and consequently at the inlet to the compressor.

102 designates the supporting pedestal for the tank 79.

In normal operation, the oil level inside the tank 79 is established substantially along a line 103 so that the sintered tube is permanently immersed in the oil mass, which allows said oil to rise by capillarity in the wall of the tube 91 then to impregnate the sintered wafer 88.

The gases coming from the evaporator arrive through the tube 100, so they are obliged to go through the sintered tube 91 and/or the sintered wafer 88 which filters them.

The oil in suspension in the gases arriving through the tube 100 is deposited on the wafer 88 and tube 91. A part of that oil is carried along by the gases and the oil in excess falls to the bottom of the tank 79.

The support 95 rising to a certain height inside the tank 79, the oil which is above said support may possibly be used up rapidly, particularly upon starting. When the oil level reaches the upper brim of the support 95 that oil is compelled to flow only through the hole 98, which decreases the amount of oil brought to the sintered tube and wafer, thus allowing the oil which has been carried along in the refrigerating circuit, at the beginning of the operation, to go through the latter and to be brought anew into the tank 79 through the duct coming from the evaporator into end piece 99 before that tank is completely emptied.

The invention is not limited to the examples of embodiment described in detail as various modifications may be made thereto within its scope.

I claim:

1. A device for the lubricating, filtering and regulating the circuit containing oil and coolant fluid of compression type refrigeration apparatus, comprising an enclosure partly filled with oil, a connection element communicating with the upper portion of said enclosure and with the suction portion of the circuit of the refrigeration apparatus, a sintered filtering element interposed in said enclosure to be permanently in contact with the oil and to intercept said connection element so that the coolant fluid and oil are compelled to go through said sintered filtering element, and a feeding duct entering said enclosure and opening above the level of the oil to feed said enclosure with coolant fluid in the cold phase.

2. A method for the continuous lubrication, filtering and regulation of the circulation in the circuit containing oil and coolant fluid of compression type refrigeration apparatus, which comprises directing the coolant fluid with the oil into an enclosure having walls onto which the oil is at least in part separated from the coolant fluid which was carrying it, impregnating with oil a porous filtering element of sintered material, immersing a portion of the filtering element in a mass of oil fed by the oil flowing from the walls of said enclosure, and directing the coolant fluid through said porous filtering element before said latter fluid is sucked by the compressor of the refrigeration apparatus.

3. A method for the continuous lubrication, filtering and regulation of the circulation in the circuit containing oil and coolant fluid of compression type refrigeration apparatus, which comprises directing the coolant fluid with the oil into an enclosure having walls onto which the oil is at least in part separated from the coolant fluid which was carrying it, impregnating with oil a porous filtering element of sintered material, immersing a portion of the filtering element in a mass of oil fed by the oil flowing along the walls of said enclosure, directing the coolant fluid through said porous filtering element before said latter fluid is sucked by the compressor of the refrigeration apparatus, and bringing the compressed and condensed fluid in thermal relationship with said enclosure containing fluid in cold phase before its sucking by the compressor.

4. A device according to claim 1, in which the filtering element of sintered material comprises a wafer arranged at the upper portion of the enclosure, said wafer having a hole at its central portion and a tube which bears against the bottom of said enclosure and which is spun in the hole of said wafer.

5. A device according to claim 1, in which the filtering element comprises a wafer of sintered material arranged at the upper portion of the enclosure, said wafer having a central hole, a tube of sintered material bearing against the bottom of said enclosure and having its upper portion fastened in the hole of said wafer and a tubular element secured on the bottom of the enclosure and provided near its base with a hole of small section limiting the amount of oil brought in contact with the sintered tube when the latter reaches a certain level.

6. A device for the lubricating, filtering and regulating the circuit containing oil and coolant fluid of compression type refrigeration apparatus, comprising an enclosure partly filled with oil, a connection element communicating with the upper portion of said enclosure and with the suction portion of the circuit of the refrigeration apparatus, a sintered filtering element interposed in said enclosure to be permanently in contact with the oil and to intercept said connection element so that the coolant fluid and oil are compelled to go through said sintered filtering element, a feeding duct entering said enclosure and opening above the level of the oil to feed said enclosure with coolant fluid in cold phase, a casing embedding at least in part said enclosure to contain the condensed fluid, an inlet duct opening at the upper portion inside said casing to admit the exhausted fluid, and an outlet duct opening at the lower portion of said casing for the exit of the fluid which had been in thermal relationship with said enclosure.

7. A device according to claim 6, in which the filtering element comprises a cartridge of sintered material, a sealed box surrounding said cartridge, said sealed box being provided at its upper portion with a large section hole for the passage of gases and at its lower portion with a small section hole for the passage of the oil.

8. A device according to claim 6, in which the filtering element comprises a wafer of sintered material, located near the duct through which the coolant fluid is sucked, a partition separating the enclosure in two chambers, said partition having at its upper portion a hole of large section and at its lower portion a hole of very small section.

9. A device according to claim 6, in which a grid is stretched inside the casing embedding at least in part the enclosure for avoiding the forming of foam.

10. A device according to claim 6, in which the enclosure has the shape of a tube extending lengthwise of the lower portion of the casing to be normally inside the mass of condensed fluid contained by said casing.

11. A device according to claim 6, in which the enclosure is constituted by a hermetically closed bell associated with one end portion of the casing wherein the condensed coolant fluid is brought.

References Cited in the file of this patent
UNITED STATES PATENTS

| | | |
|---|---|---|
| 1,736,721 | Myers | Nov. 19, 1929 |
| 1,797,385 | Weissenburger | Mar. 24, 1931 |
| 2,023,241 | Ralston | Dec. 3, 1935 |
| 2,343,514 | McCormack | Mar. 7, 1944 |